US00RE45966E

(19) United States
(12) Reissued Patent
Alfier et al.

(10) Patent Number: US RE45,966 E
(45) Date of Reissued Patent: Apr. 5, 2016

(54) CIRCUIT AND METHOD FOR DRIVING LIGHT SOURCES AND LIGHTING SYSTEM

(71) Applicant: Osram GmbH, Munich (DE)

(72) Inventors: Alberto Alfier, Vedelago (IT); Lorenzo-Roberto Trevisanello, Abano Terme (IT); Simone Massaro, Treviso (IT); Matteo Toscan, Maser (IT)

(73) Assignee: Osram GmbH, Munich (DE)

(21) Appl. No.: 14/614,511

(22) Filed: Feb. 5, 2015

Related U.S. Patent Documents

Reissue of:
(64) Patent No.: 8,749,150
Issued: Jun. 10, 2014
Appl. No.: 13/650,183
Filed: Oct. 12, 2012

(30) Foreign Application Priority Data

Oct. 14, 2011 (IT) ..... TO2011A0925

(51) Int. Cl.
*H05B 37/02* (2006.01)

(52) U.S. Cl.
CPC ..... *H05B 37/02* (2013.01)

(58) Field of Classification Search
CPC ..... H05B 37/02
USPC ..... 315/186, 217, 295
See application file for complete search history.

(56) References Cited

U.S. PATENT DOCUMENTS 6,798,152 B2 * 9/2004 Rooke et al. ..... H05B 33/0815 315/209 R
7,728,798 B2 * 6/2010 Kim ..... G09G 3/3413 345/102
7,919,936 B2 * 4/2011 Liu et al. ..... H05B 33/0827 315/185 R
7,986,107 B2 * 7/2011 Weaver et al. ..... H05B 33/0812 315/121
8,278,837 B1 * 10/2012 Lenk ..... H05B 37/02 315/185 S
2010/0033109 A1 2/2010 Liu et al. ..... H05B 33/0827 315/294
2010/0109570 A1 5/2010 Weaver

FOREIGN PATENT DOCUMENTS

DE 102004032456 B3 4/2006
WO WO 2009039112 A1 3/2009

OTHER PUBLICATIONS

Office Action issued for corresponding Chinese application No. 201210387702.0 on Mar. 20, 2015.
English-language abstract of DE 102004032456 B3.

* cited by examiner

*Primary Examiner* — Angela M Lie
(74) *Attorney, Agent, or Firm* — Viering, Jentschura & Partner mbB

(57) ABSTRACT

A circuit for driving a plurality of light sources via a current generator, wherein the light sources are grouped into a plurality of light source sets wherein the driver circuit comprises a plurality of inductive elements, a plurality of switches adapted to selectively connect each light source set in series with one of the inductive elements, and a control circuit configured for driving the switches, so that during a first operation time interval, each light source set is connected in series with a respective first inductive element, and during a second operation time interval, each light source set is connected in series with a respective second inductive element, wherein the respective second inductive element is separate from the respective first inductive element.

10 Claims, 5 Drawing Sheets

CIRCUIT AND METHOD FOR DRIVING LIGHT SOURCES AND LIGHTING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED [APPLICATION] *APPLICATIONS*

[This application] *The present application is a reissue application of U.S. Pat. No. 8,749,150, issued Jun. 10, 2014 and which* claims priority to Italian Patent Application *Serial* No. TO2011A000925, which was filed Oct. 14, 2011 and is incorporated herein by reference in its entirety.

TECHNICAL FIELD

The present disclosure relates to circuits for driving light sources. In particular, various embodiments relate to electronic converters for light sources.

BACKGROUND

Electronic converters for light sources comprising, for example, at least one LED (Light Emitting Diode) usually supply an output direct current. Such a current may be stable or vary in time, for example, in order to regulate the intensity of the light emitted by the light source (so called "dimming" function).

FIG. 1 shows a possible lighting system comprising an electronic converter 10 and a LED module 20, including at least one LED L.

Electronic converter 10 usually comprises a control circuit 102 (for example a microprocessor) and a power circuit 104 (for example a switching power supply AC/DC or DC/DC) receiving as input a supply signal (for example from the electric line) and outputting, through a power output 106, a direct current. This current may be stable or can vary in time. For example, control circuit 102 may set, via a reference channel $I_{Ref}$ of power circuit 104, the current required by LED module 20.

For example, LED module 20 may also comprise an identification element, which identifies the current required by LED module 20 (or in general control parameters). In this case, control circuit 102 communicates with the identification element, and adjusts the operation of the electronic converter to the operating conditions required by the LED module.

FIG. 1 also shows two switches 108 and 110. The first switch 108 permits to regulate the light intensity emitted by LED module 20. For example, switch 108 may be driven via a pulse-width modulation (PWM) in order to selectively short-circuit LED module 20, while deviating the current from generator 104 onto switch 108. However, a brightness regulation of the light intensity emitted by LED module 20 can also be achieved by setting a lower reference current $I_{Ref}$.

The second switch 110 allows deactivation of the supply to LED module 20. For example, an electronic converter may deactivate the supply when an error condition is detected, or for reasons of reliability, for example when an over-current, over-voltage or over-temperature condition is detected.

Generally speaking, LED module 20 may comprise one single LED or a LED chain or string, wherein a plurality of LEDs are connected in series. However, most international safety standards, such as for example the IEC (International Electrotechnical Commission) or the UL (Underwriters Laboratories) standards, classify LED modules according to electric or fire risk ratings, on the basis of their maximum supply voltage. As a consequence, a higher supply voltage leads to a lower safety rating, which can also raise the safety requirements of the mechanical structure of the LED module (and therefore the cost thereof) and can set constraints to the final applicability of the product.

As a consequence, in order to reduce the maximum supply voltage, LEDs may also be divided into plural branches connected in parallel. For example, as shown in FIG. 1, each LED module may comprise a plurality of LED strings connected in parallel, or power supply 10 may feed a plurality of LED modules 20 connected in parallel.

However, as a consequence of manufacturing tolerances, each LED may have different electrical and optical features, possibly causing a lack of uniformity in the light created by LED strings.

In order to avoid such problems, lighting systems have been known wherein each LED string comprises a dedicated current regulator, such as for example a linear current regulator, and LED modules 20 are fed with a voltage, i.e. electronic converter 10 may create on line 106 a fixed voltage. Such a voltage may also be set on the minimum possible value which is determined, for example via sensors detecting the voltage drop across the linear regulators.

SUMMARY

The previously described solutions have a number of drawbacks. For example, in addition to requiring a linear regulator for each string, these solutions have a lower optical efficiency, due to the electric losses caused by the resistive loads of the regulators. Moreover, the thermal dissipation of current regulators must be taken into account as well.

According to various embodiments, a circuit for driving light sources is disclosed having the features specifically set forth in the claims that follow. The embodiments also concern a related lighting system and a method of driving light sources.

The claims are an integral part of the technical teaching of the invention provided herein.

In various embodiments the light sources, e.g. the LEDs, are supplied via a current generator. Specifically, the light sources are grouped into light source sets such as LED modules, comprising a LED string.

In various embodiments, the driver circuit for such light source sets comprises inductive elements and switching means, adapted to selectively connect each light source set in series with one of the inductive elements, for example switches or changeover switches. Preferably, the number of inductive elements matches the number of the light source sets.

In various embodiments, the driver circuit also comprises a control circuit for driving the switching means in such a way that, during a first operation time interval, each light source set is connected in series with a respective first inductive element. On the contrary, during a second operation time interval, each light source set is connected in series with a respective second inductive element.

Therefore, the resistive loads of the light source sets, or the voltage drops across the LED junctions, are connected in an alternated way to different inductors, and the light generated by the light sources is more uniform.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
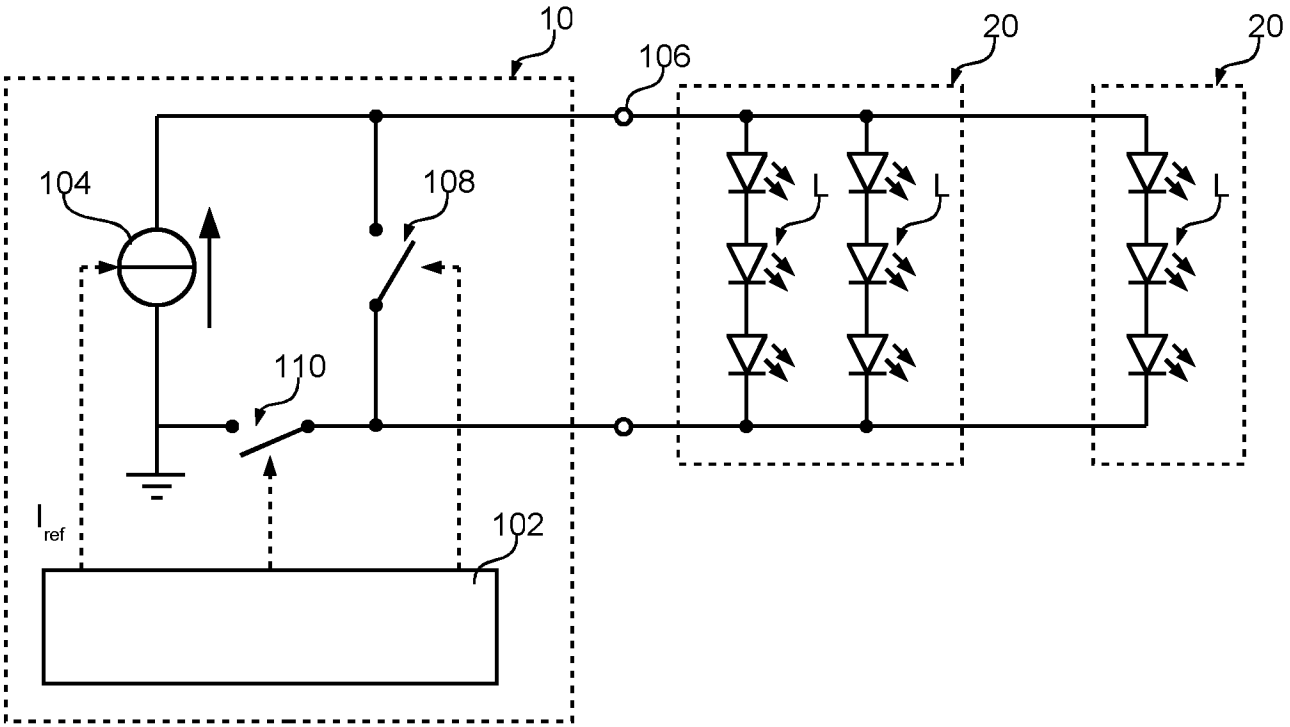
FIG. 1 is a circuit diagram illustrating a lighting system.
Figure 2:
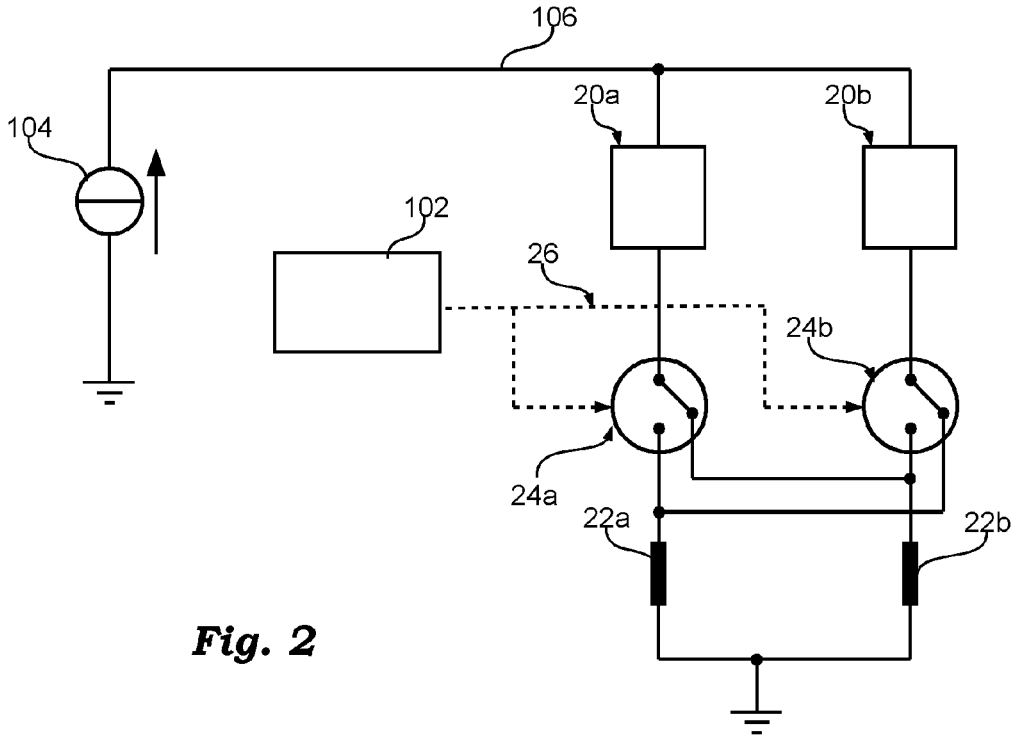
FIG. 2 is a circuit diagram illustrating an embodiment of the present disclosure.

FIG. 2 shows an embodiment of an electronic converter 10 comprising a power circuit 104. Generally speaking, such a converter 10 may also comprise control circuit 102, switch 108 and/or switch 110, which have been previously described with reference to FIG. 1.

In various embodiments, power circuit 104 (for example an AC/DC or a DC/DC switching power supply) receives as input a supply signal (for example from the electric line) and outputs, through a power output 106, a direct current. For example, in the considered embodiment electronic converter 10 supplies two LED modules 20a and 20b.

In the disclosed embodiment, driver circuit 10 also comprises two inductive elements 22a and 22b, for example inductors, and switching means 24a and 24b, for example two changeover switches, adapted to selectively connect each LED module (20a and 20b) in series with one of the inductors (22a or 22b).

For example, in the disclosed embodiment, the switching of electronic changeover switches 24a and 24b is controlled via control circuit 102, which actuates both switches 24a and 24b simultaneously through a common control signal 26.

As a consequence, in a first operation time interval, LED module 20a is connected in series with inductive element 22a, and LED module 20b is connected in series with inductive element 22b. Instead, in a second operation time interval, LED module 20a is connected in series with inductive element 22b, and LED module 20b is connected in series with inductive element 22a.

In an embodiment, control circuit 102 is adapted to repeat such an operation time interval sequence periodically.

Therefore, the resistive load of LED strings, i.e. the voltage drops across LED junctions, are connected in an alternated fashion to inductors 22a and 22b, and the current in each LED string is leveled on the same average current. The noise or ripple width around such an average value is defined essentially through the values of inductors 22a and 22b, and the difference between voltage drops at LED strings, i.e. the width is lower for higher inductance values and/or for lower differences between LED strings. For example, in an embodiment, in order to minimize such oscillations, the difference between voltage drops across LED strings is lower than 5%.

Generally speaking, the value of the impedances and the switching frequency should be chosen while taking into account both the mechanical size of the components and the width of the oscillations.

Figure 3:
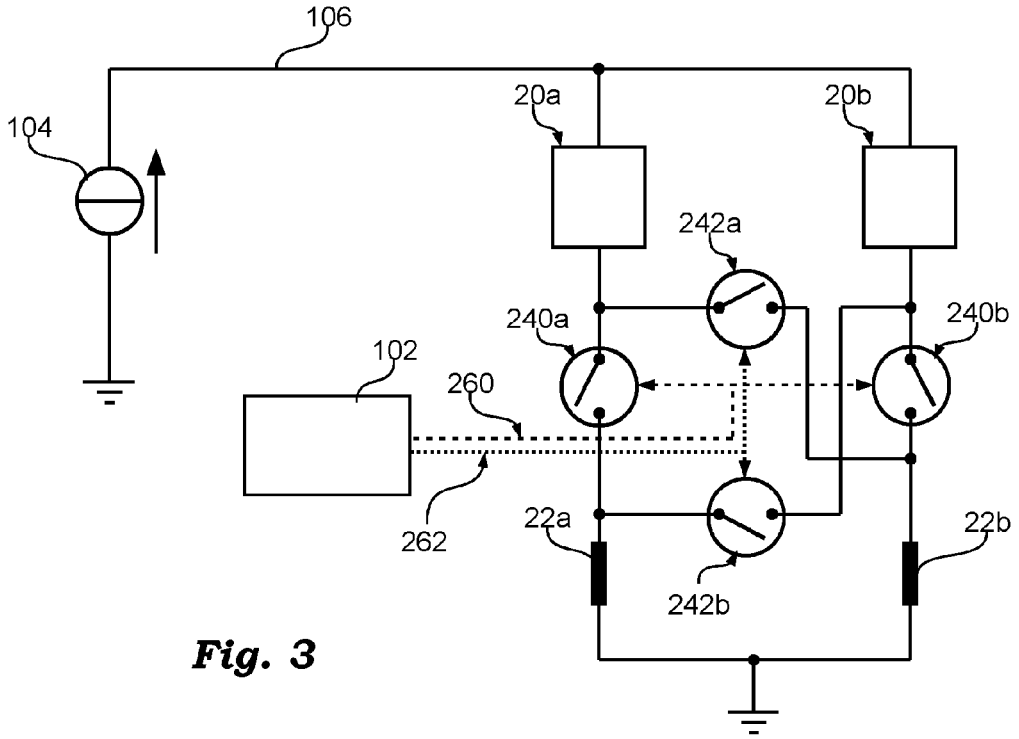
FIG. 3 is a circuit diagram illustrating an embodiment of the present disclosure.

For example, FIG. 3 shows a first possible embodiment, wherein two electronic switches are used for each switching means 24a and 24b.

Specifically, in the considered embodiment, a first switch 240a is connected between LED module 20a and inductor 22a, and a second switch 242a is connected between LED module 20a and inductor 22b. Similarly, a third switch 240b is connected between LED module 20b and inductor 22b, and a fourth switch 242b is connected between LED module 20b and inductor 22a.

Figure 4A:
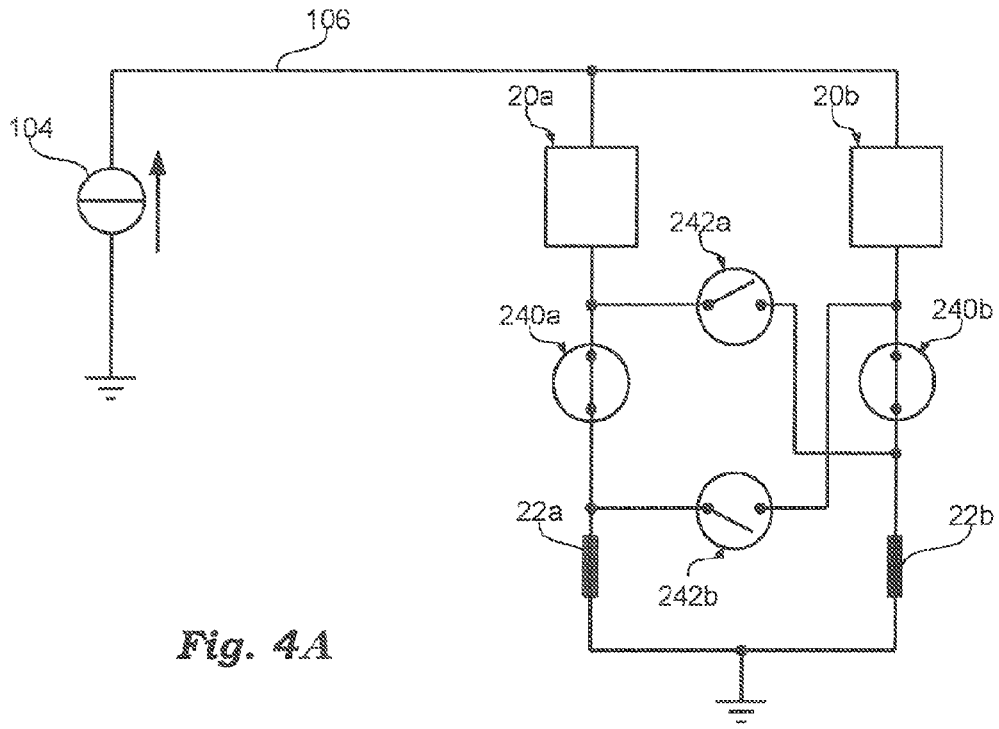
FIG. 4A is a circuit diagram illustrating an embodiment of the present disclosure.
Figure 4B:
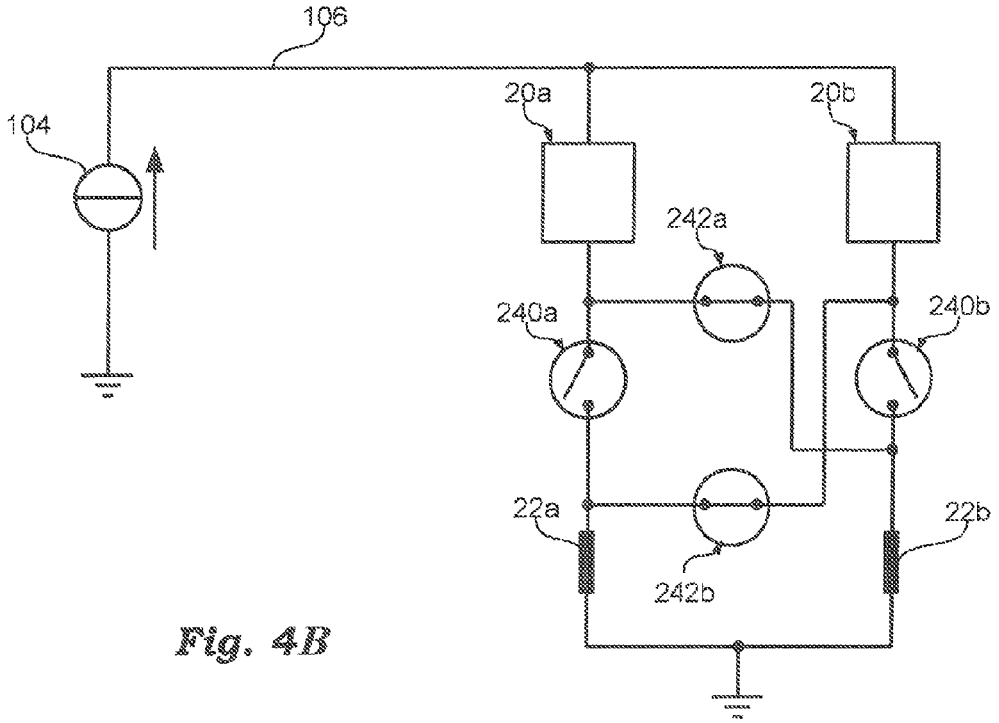
FIG. 4B is a circuit diagram illustrating an embodiment of the present disclosure.

As a consequence, during the first operation time interval (see for example FIG. 4A), switches 240a and 240b are closed and switches 242a and 242b are open, while during the second operation time interval (see for example FIG. 4B), switches 240a and 240b are open and switches 242a and 242b are closed. For example, to this purpose, switches 240a and 240b and switches 242a and 242b may be driven respectively through two synchronized control signals 260 and 262. For example, in an embodiment, control circuit 102 comprises a two-phase clock generator, i.e. a clock generator which generates a first clock signal 260 and a second clock signal 262 which corresponds to an inverted first clock signal.

Figure 5:
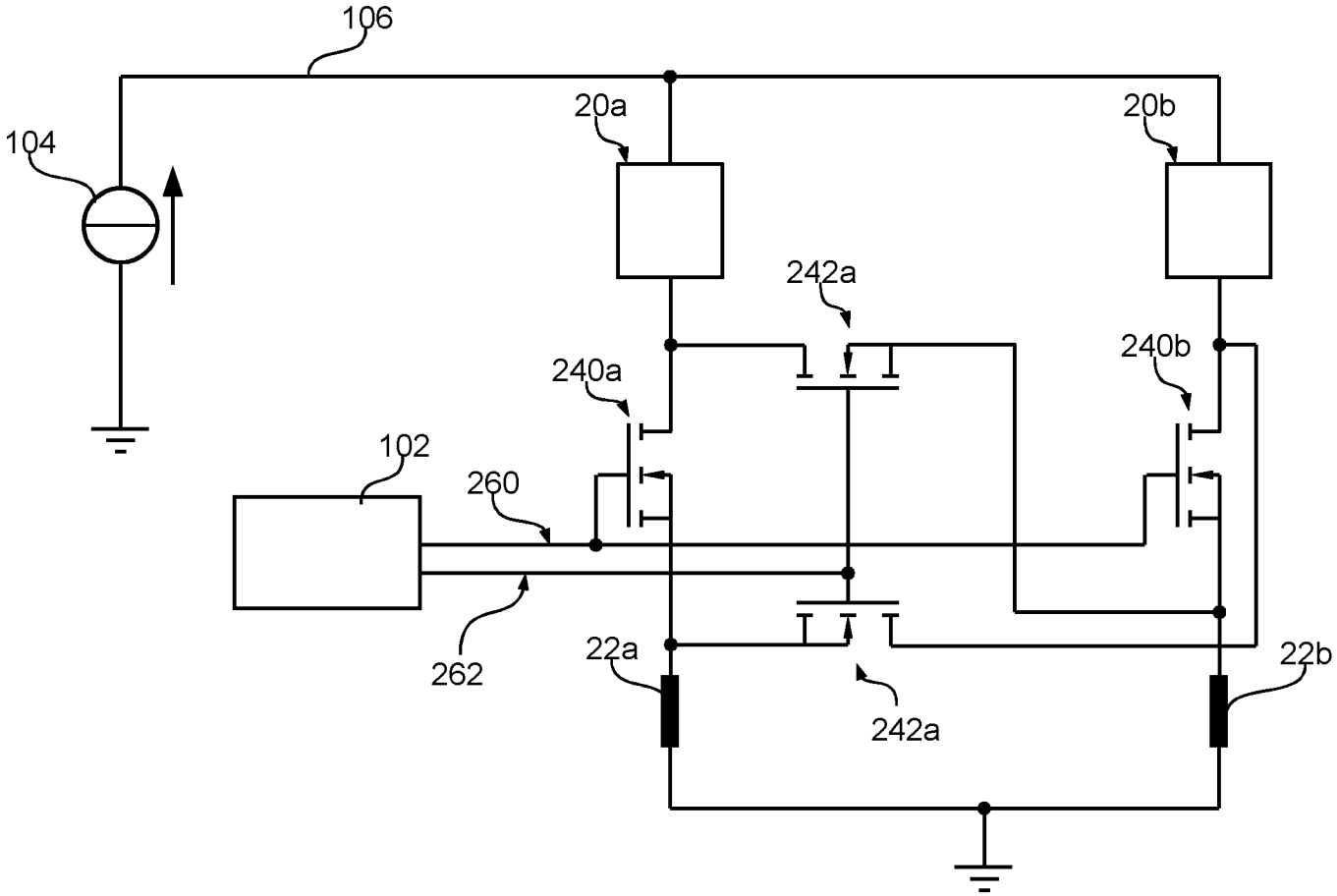
FIG. 5 is a circuit diagram illustrating an embodiment of the present disclosure.

FIG. 5 shows a possible embodiment wherein power transistors, such as for example metal-oxide-semiconductor field-effect transistors (MOSFETs), are used as switches 240a, 240b, 242a and 242b. The expert in the field will appreciate that a specific kind of transistor may be chosen in order to reduce resistance between drain and source, and therefore electrical losses.

In an embodiment which is particularly useful for MOSFET transistor driving, the control circuit generates control signals 260 and 262 through a H-bridge driver. Such driver circuits for H bridges are known in the field of DC/AC and DC/DC switch-mode electronic converters, which makes a detailed description thereof unnecessary.

In the previously considered embodiments, the switching means 24a and 24b and inductors 22a and 22b belong to electronic converter 10; for the embodiments shown in FIGS. 2 to 5 three connection wires are needed between converter 10 and LED modules 20a and 20b.

However, generally speaking both control circuit 102 and switching means 24a and 24b, as well as inductors 22a and 22b, may not belong to the converter and may for example be added to existing arrangements.

Moreover, in case LED module(s) 20 should comprise a plurality of LED strings connected in parallel, switching means 24a and 24b and inductors 22a and 22b may also belong to such a LED module. In this case, also control circuit 102 may be included into LED module.

The previously described figures can also be applied to a higher number of LED strings.

For example, if the number of LED strings is even, LED strings may be grouped into sets each comprising always and only two LED strings, and which are driven as previously described.

Figure 6:
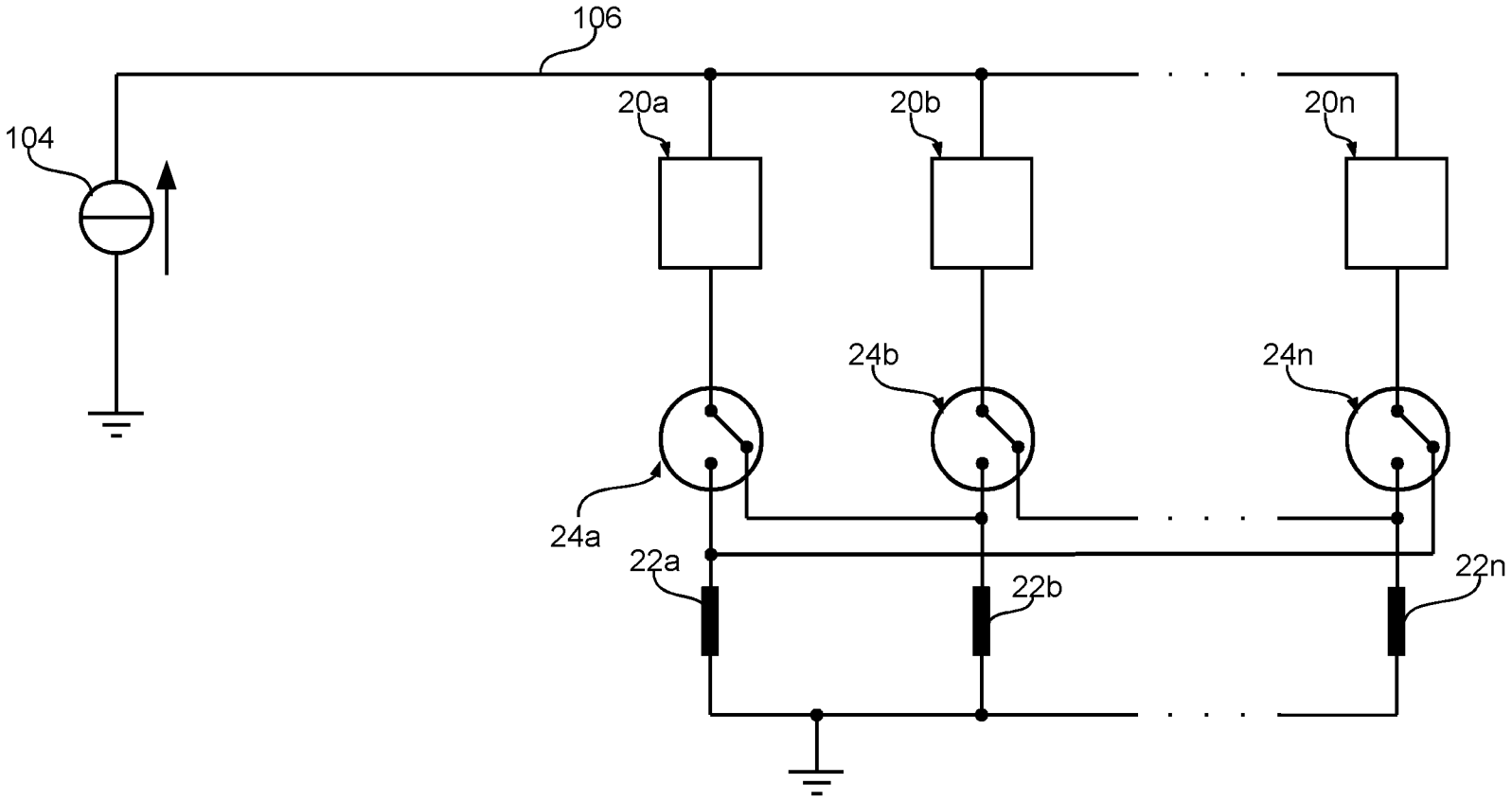
FIG. 6 is a circuit diagram illustrating an embodiment of the present disclosure.

On the contrary, FIG. 6 shows an embodiment which may also be used for any number of strings (an odd number as well).

Specifically, in the considered embodiment, a plurality of LED strings 20a, 20b, . . . , 20n is connected in parallel, and for each LED string a respective inductor 22a, 22b, . . . , 22n is provided.

Also in this case respective switching means 24a, 24b, . . . , 24n (such as changeover switches) are associated to each LED string 20a, 20b, . . . , 20n, i.e. the number of switching means matches the number of LED strings and the number of inductors.

In general, switching means 24a, 24b, . . . , 24n are adapted to selectively connect each LED string to a respective inductor 22a, 22b, . . . , 22n, wherein, during a first operation time interval, each LED string 20a, 20b, . . . , 20n is connected to a respective first inductor 22a, 22b, . . . , 22n, and during a second operation time interval each LED string 20a, 20b, . . . , 20n is connected to a respective second inductor 22a, 22b, . . . , 22n, wherein the second inductor is separate from the first inductor.

For example, in the presently considered embodiment, the switching means are configured to form a closed loop, i.e. the first LED string 20a may be connected to the first inductor 22a or to the second inductor 22b, the second LED string 20a may be connected to the second inductor 22b or to the third inductor, etc. On the contrary, the last LED string 20n may be connected to the last inductor 22n or to the first inductor 22a.

In general, in order to better distribute the current onto the LED strings, it is possible to provide further operation time intervals, wherein each LED string is connected to a respective inductor, which in the previous time intervals has not yet been connected in series with such a LED string.

As a consequence, the previously described embodiments have several advantages, such as for example:

In the case of two LED strings, the current generated via generator 104 is distributed equally to both LED strings;

The use of inductors and/or changeover switches/switches introduces only small electric losses;

A single current generator is sufficient and it is not necessary to use current regulators for each LED string, which makes it possible to use the described solution also in lighting systems already comprising a current generator;

The control of the system is easy, and can be accomplished via a conventional two-phase clock generator;

It is possible to distribute possible manufacturing tolerances of the various components (comprising the inductors as well) on the various branches, which makes the solution very stable; and The solution can be extended to any number of LED strings, for example by adding, for each further string, a new H-bridge circuit arrangement.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A circuit for driving a plurality of light sources via a current generator, wherein said light sources are grouped into a plurality of light source sets, wherein the driver circuit comprises:

a plurality of inductive elements;

a plurality of switches adapted to selectively connect each light source set in series with one of said inductive elements; and a control circuit configured for driving said plurality of switches, so that a) during a first operation time interval, each light source set is connected in series with a respective first inductive element, and b) during a second operation time interval, each light source set is connected in series with a respective second inductive element, wherein the respective second inductive element is separate from the respective first inductive element.

2. The driver circuit according to claim 1, wherein the number of inductive elements corresponds to the number of said light source sets.

3. The driver circuit according to claim 1, wherein said switches are changeover switches.

4. The driver circuit according to claim 3, wherein said control circuit is configured for driving said changeover switches with a common control signal.

5. The driver circuit according to claim 1, wherein each of said switches comprises a respective first and a respective second electronic switch, such as MOSFET transistors, and wherein said control circuit is configured for driving said switches, so that:

a) during said first operation time interval, the respective first switch of each of said switches is closed and the respective second switch of each of said switches is opened, and b) during said second operation time interval, the respective first switch of each of said switches is opened and the respective second switch of each of said switches is closed.

6. The driver circuit according to claim 5, wherein said control circuit is configured for driving said first switch and said second switch of each of said switches with a respective first and second common control signal.

7. The driver circuit according to claim 5 or claim 6, wherein said control circuit comprises a two-phase clock generator and/or an H-bridge driver circuit.

8. A lighting system comprising:

a plurality of light sources grouped into a plurality of light source sets;

a current generator configured for powering said light source sets with a current; and a driver circuit, wherein the driver circuit comprises:

a plurality of inductive elements;

a plurality of switches adapted to selectively connect each light source set in series with one of said inductive elements; and a control circuit configured for driving said plurality of switches, so that a) during a first operation time interval, each light source set is connected in series with a respective first inductive element, and b) during a second operation time interval, each light source set is connected in series with a respective second inductive element, wherein the respective second inductive element is separate from the respective first inductive element.

9. The lighting system according to claim 8, wherein each light source set is included in a respective LED module.

10. A method of driving a plurality of light sources via a current generator, wherein said light sources are grouped into a plurality of light source sets, the method comprising the steps of:

providing a plurality of inductive elements;

providing a plurality of switches adapted to selectively connect each light source set in series with one of said inductive elements; and driving said plurality of switches, so that a) during a first operation time interval, each light source set is connected in series with a respective first inductive element, and b) during a second operation time interval, each light source set is connected in series with a respective second inductive element, wherein the respective second inductive element is separate from the respective first inductive element.

* * * * *